May 30, 1944.    M. HURLEY    2,349,965
HEATING APPLIANCE
Filed June 26, 1942    2 Sheets-Sheet 1
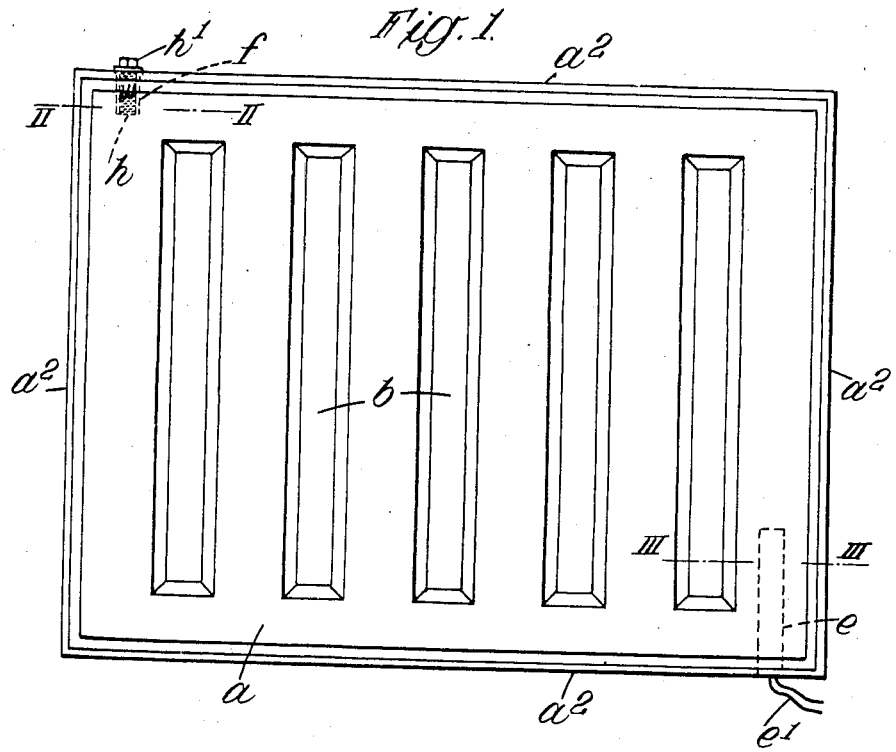
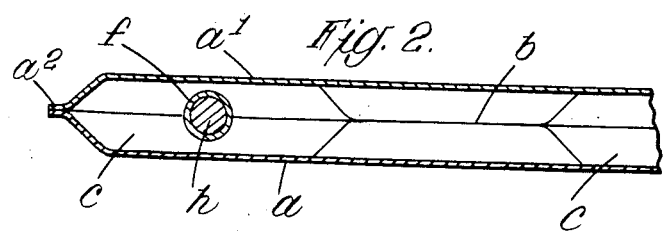
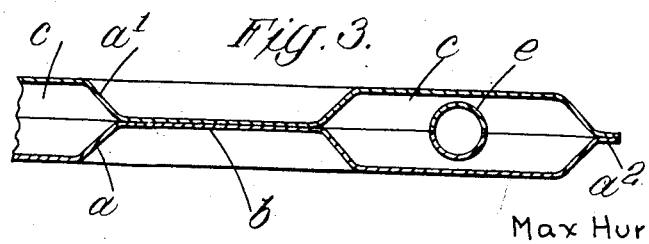
Max Hurley
INVENTOR
By [signature]
his ATTY.

May 30, 1944.   M. HURLEY   2,349,965
HEATING APPLIANCE
Filed June 26, 1942   2 Sheets-Sheet 2
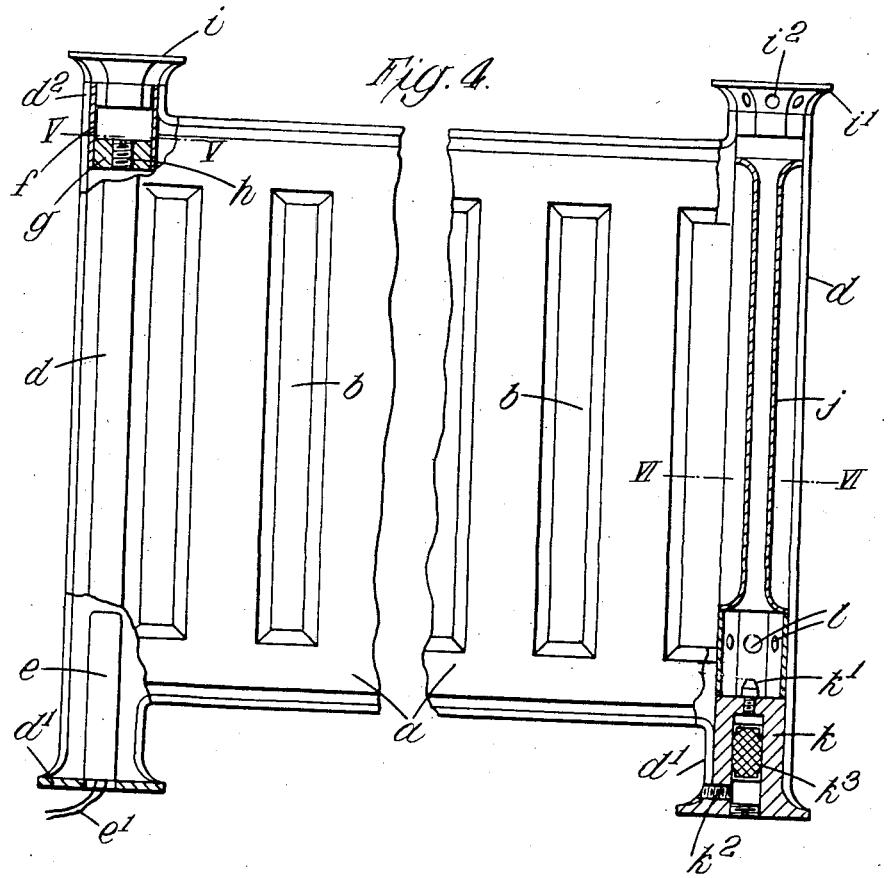
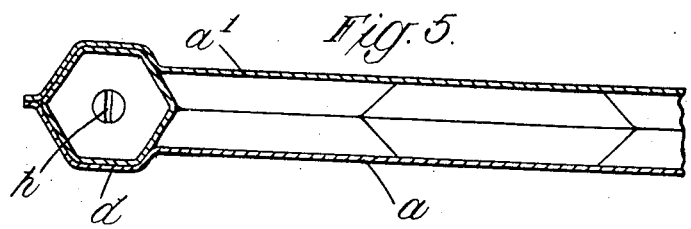
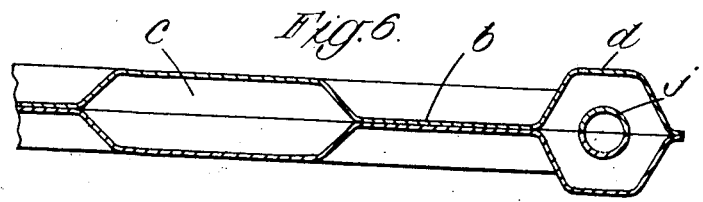
Max Hurley
INVENTOR
By [signature]
his ATTY.

Patented May 30, 1944

2,349,965

UNITED STATES PATENT OFFICE 2,349,965

HEATING APPLIANCE

Max Hurley, London, England, assignor to Hurseal Patents Limited, London, England, an English joint-stock company Application June 26, 1942, Serial No. 448,566
In Great Britain March 7, 1941

1 Claim. (Cl. 219—38)

This invention relates to improvements in heating devices for heating rooms, horticultural houses and similar spaces.

A great number of such devices have been proposed in the form of heat radiators in which a circulating medium heated electrically or by solid, gaseous or liquid fuel circulates in convenient apparatus. Amongst the circulating liquid it has been proposed to use oil.

Now, the object of the present invention is to provide an improved form of heating apparatus which is relatively cheap to construct, simple to operate and efficient in use.

The apparatus according to the invention essentially consists of a heating body composed of pressed metal sheets arranged to contain an oleaginous circulating liquid, a source of heat, and means through which the liquid may be introduced into the heater and for limiting the extent of filling; the oleaginous circulating liquid being introduced into the heater at a temperature of at least about 140° F., whereafter the filling aperture is closed.

The oleaginous circulating liquid preferably has a high boiling point and low coefficient of expansion. It is conveniently a mineral oil having a viscosity between 120 and 178 secs. (Redwood) at 70° F. and may, for example, comprise a paraffin oil a viscosity of 175 secs. (Redwood) at 70° F., a specific gravity of 0.8602 at 60° F., and a flash point of 347° F. (Pemsky Martens closed cup).

The heater body is composed of two or more pressed metal sheets and preferably pressed steel sheets so fashioned that portions thereof contact leaving between them liquid circulating paths as well as upper and lower liquid circulating paths. The heat may be generated by a flame, for example, a gas, oil or solid fuel flame, or it may be heated electrically, in which case it is preferred that the electric heating element be separable from the heater when the casing thereof desirably skin-fits a suitably provided cavity arranged in the heater body.

The means permitting the introduction of the circulating liquid and for limiting the extent of filling of the heater body conveniently comprises a filling aperture closable by a plug which is so arranged that the circulating liquid can only fill the heater body to within about a third of the top of the upper circulating channel. After closure the plug may be sealed.

If desired, thermostat means may be provided for regulating the temperature and it will be appreciated that the heating device may be arranged as a floor, wall, or panel-mounted device, as well as being readily portable which is especially advantageous for an electrically heated device as it may be taken wherever required and simply plugged in to a suitable electric circuit.

In order that the invention may be clearly understood and readily carried into effect, it is hereinafter more fully described with reference to the accompanying drawings which are given by way of example only and not of limitation.

In these drawings:

Figure 1 is a front elevation of an elemental form of heater.

Figure 2 is a section on the line II—II of Figure 1,

Figure 3 is a section on the line III—III of Figure 1.

Figure 4 is a front elevation, partly in section, of a modified form of heater showing on the left-hand side the electrical heating thereof and on the right-hand side the gaseous heating thereof, Figure 5 is a section on the line V—V of Figure 4, and Figure 6 is a section on the line VI—VI of Figure 4.

Referring now to the said drawings in which like parts bear like reference letters and with particular reference to Figures 1 to 3, the heater essentially consists of metal sheets $a$, $a^1$ having pressed-in portions $b$ which engage and leave vertical liquid circulating channels $c$. The arrangement is such that, at the top and bottom of the device, there are horizontal liquid circulating paths into which the vertical paths $c$ open. The edges of the sheets $a$, $a^1$ are brought together as at $a^2$ and suitably joined by welding.

In an upper corner a sleeve $f$ is provided extending into the body of the heater which is adapted to be closed by a threaded member $h$. A threaded cap $h^1$ closes the outer surface of the sleeve $f$. To fill the heater, the members $h$, $h^1$ are removed and the liquid is introduced through the sleeve $f$. When the liquid reaches the bottom of the sleeve, no further liquid may be introduced and a space is left above the liquid so that the latter fills the upper horizontal circulating path about two thirds of the way up.

The liquid circulating medium is introduced through the plug $g$ at a temperature of about 140° F. or a temperature thereabove, which may be in excess of the maximum intended operating temperature of the heater. Immediately the filling operation is complete the member $h$ is repositioned and screwed home into the plug $g$, whereafter the cap $h^1$ is positioned.

In a lower corner, preferably diametrically opposite to the filling aperture, is arranged a heating element $e$ which is secured fluid-tight to the sheets $a$, $a^1$. Current is taken to the heating element through leads $e^1$ connected or plugged to a suitable source of current supply.

The form of apparatus so far described is suitable for panel or wall mounting, for which purpose the back sheet may be provided with attachment means enabling it to be conveniently fixed to a wall or the like.

A more elaborate form of apparatus for floor mounting will now be described with reference to Figures 4 to 6. As in the previous example, the heater body comprises two metal sheets $a$, $a^1$ having pressed-in portions $b$ which engage and leave vertical liquid circulating channels $c$. The arrangement is such that, at the top and bottom of the device, there are horizontal liquid circulating paths into which the vertical paths $c$ open. The edges of the sheets $a$, $a^1$ are suitably joined by welding.

It is preferred that the outer section $d$ is somewhat enlarged, as may be seen from Figure 5, and that portion is extended to form a foot $d^1$ and an upper extension $d^2$. Within the foot portion is arranged a walled cavity into which the heater element $e$ may be introduced so that the surface thereof will engage as a skin-fit with the walls of the cavity so that the heat generated by the element may be readily transferred to the wall of the cavity and so to the liquid within the heater body.

Within the extension $d^2$ is a sleeve or the like $f$ having at its lower end an apertured plug $g$ closed by a threaded member $h$. This arrangement is such that, on removing the member $h$, the liquid circulating medium may be introduced into the heater body through the aperture in the plug $g$, which plug is so situated that it prevents the liquid from entirely filling the heater body so that a space is left in the upper horizontal circulating passage. It is preferred that the filling is not more than about two-thirds of the way up the upper horizontal circulating passage.

An ornamental cap $i$ of suitable form is placed on the extension $d^2$ to finish the appearance of the device.

The other end of the device is similar in appearance to that described and the cap thereon, equivalent to the cap $i$, may be firmly fixed.

On the right-hand side of Figure 4 is shown an arrangement for the gaseous heating of the circulating liquid, the other portions of the apparatus being as previously described, with the exception, of course, that the heater element may be omitted, although, in some cases, it may be additionally provided as an alternative heating means for use when there is a gas failure.

Within the end section $d$ is arranged a flue tube $j$ the ends of which are extended and connected fluid-tight to the adjacent portions of the sheets $a$, $a^1$. The flue $j$ is closed off at its upper end by an ornamental cap $i^1$ which may be provided internally with a layer of asbestos and also has one or more outlet apertures $i^2$ for the escape of combustion gases.

Below the flue $j$ is arranged a gas burner $k$ located within the foot $d^1$, which burner has a small orifice jet $k^1$. Gas from a suitable pipe (not shown) is let in through a threaded aperture $k^2$ and the burner is completed by the provision of wadding or the line $k^3$ to prevent blowback. Ports $l$ for the admission of combustion air are provided adjacent the jet $k^1$ and, if desired, that portion may be lined with asbestos or equivalent material.

In use, the gas is turned on and the jet ignited when hot air rising in the flue $j$ heats the circulating liquid and causes it to circulate across the upper horizontal path and down the vertical paths back along the lower horizontal paths.

It will be appreciated that the gas flame heating device could be replaced by an oil fuel or solid fuel flame heating device.

The form of apparatus described with reference to Figures 4 to 6 is particularly intended for floor mounting, but it may be arranged as a movable piece of apparatus when it may be provided with a handle and, in this form, is especially advantageous when heated electrically or by means of oil or solid fuel.

If desired, thermostat control may be provided for regulating the heating of the apparatus.

I claim:

A heating apparatus comprising a radiator body having therein a plurality of unimpeded vertical fluid flow-paths, an unimpeded horizontal flow-path at one end of said vertical flow-paths and another unimpeded horizontal flow-path at the opposite end of said vertical flow-paths, all of said flow-paths arranged for free intercommunication, a heating element projecting vertically across the opening to only one of the horizontal flow-paths and extending upwardly into only one of the vertical flow-paths for a distance substantially less than the length of said path, a fluid inlet to the radiator body remote from the heating element and means for hermetically sealing said inlet and said radiator body, said flow-paths containing oleaginous circulating liquid having a high boiling point and low coefficient of expansion and less in volume than the total cubic capacity of said flow-paths whereby said liquid is capable of freely circulating throughout said several flow-paths.

MAX HURLEY.